(12) United States Patent
Tsai

(10) Patent No.: US 9,222,592 B2
(45) Date of Patent: Dec. 29, 2015

(54) COMPOSITE STRUCTURE OF ROTARY VALVE

(71) Applicant: SHIE YU MACHINE PARTS IND. CO., LTD., Taichung (TW)

(72) Inventor: Tien-Shou Tsai, Taichung (TW)

(73) Assignee: SHIE YU MACHINE PARTS IND. CO., LTD., Taichung (TW)

( * ) Notice: Subject to any disclaimer, the term of this patent is extended or adjusted under 35 U.S.C. 154(b) by 127 days.

(21) Appl. No.: 14/146,493

(22) Filed: Jan. 2, 2014

(65) Prior Publication Data

US 2015/0184766 A1 Jul. 2, 2015

(51) Int. Cl.
*F16K 27/02* (2006.01)
*F16K 1/22* (2006.01)

(52) U.S. Cl.
CPC .............. *F16K 27/0218* (2013.01); *F16K 1/22* (2013.01)

(58) Field of Classification Search
CPC ....... F16K 27/0218; F16K 1/22; F16K 27/00; F16K 27/02; F16K 51/00
USPC ......................................... 251/305–308, 366
See application file for complete search history.

(56) References Cited

U.S. PATENT DOCUMENTS

| | | | | |
|---|---|---|---|---|
| 3,537,683 A * | 11/1970 | Snell, Jr. | ........................ | 251/306 |
| 3,630,485 A * | 12/1971 | Williams | ....................... | 251/307 |
| 3,750,698 A * | 8/1973 | Walchle et al. | ................ | 137/375 |
| 4,510,965 A * | 4/1985 | Peroux et al. | ................. | 137/375 |
| 5,988,589 A * | 11/1999 | Mowill | ........................ | 251/305 |
| 6,352,241 B1 * | 3/2002 | Hannewald et al. | ...... | 251/129.11 |
| 6,408,817 B2 * | 6/2002 | Torii et al. | ...................... | 123/337 |
| 6,427,975 B1 * | 8/2002 | Powell | .......................... | 251/305 |
| 6,505,643 B2 * | 1/2003 | Scholten et al. | .............. | 137/554 |
| 6,901,942 B2 * | 6/2005 | Krimmer et al. | ............ | 137/15.25 |
| 2007/0063163 A1 * | 3/2007 | Yeary et al. | .................... | 251/305 |
| 2010/0065763 A1 * | 3/2010 | Suetome et al. | ......... | 251/129.01 |
| 2010/0212627 A1 * | 8/2010 | Nishimura et al. | ........... | 123/337 |

* cited by examiner

*Primary Examiner* — John Bastianelli
(74) *Attorney, Agent, or Firm* — J.C. Patents

(57) ABSTRACT

A composite structure of a rotary valve includes a valve body including a containing hole of the disc, and a metal valve body corresponding to the shape of the valve body and formed in the valve body and covered by the valve body, wherein the metal valve body improves the explosion-proof, pressure-proof, and acid/base-resistant strength and circularity of the valve body in the manufacturing process of the rotary valve, the circularity of the valve body is suitable for connecting with a pipe line. A stem is mounted on the disc, wherein the stem is extended upwardly and combined with a handle/gear/electric/pneumatic/hydraulic, or chain operation component, such that the disc can be opened or closed.

5 Claims, 7 Drawing Sheets

US 9,222,592 B2

COMPOSITE STRUCTURE OF ROTARY VALVE

FIELD OF THE INVENTION

The present invention relates to a composite structure of a rotary valve, in particular to a metal valve body formed in a valve body of a rotary valve and completely covered by the valve body, so as to improve the explosion-proof, pressure-proof, and acid/base-resistant and keep the circularity of the valve body in the manufacturing process, thus the rotary valve is conducive to connect with a pipe, and archives a structural innovation of the rotary valve with the benefit of controlling the rotary valve to control a liquid flowing or not.

DESCRIPTION OF RELATED ART

According to commercially available rotary valves, the bodies thereof are made of plastic material, such as ABS plastic material (ACRYLONITRILE-BUTADIENE-STYRENE, propylene, butadiene and styrene copolymer), each body includes a disc which is capable to rotate and determine liquid flowing or not, and the valve body is made of plastic material to provide excellent fluidity and color uniformity in the heating and melting process and has advantages of non-toxic, toughness and impact resistance. The ABS plastic material has the above advantages, but the manufacturer has to consider how to increase the forming thickness of the valve body for ensuring that the valve body can withstand high pressure of flowing fluid in the pipe with the characteristics of the plastic material. In the injection molding process, plastic material has to be molded in very short time without deformation. Thus, people have been doing their utmost to improve the structural strength of traditional rotary valves. However, increasing the thickness of the valve body causes risks of increasing the rate of defective unit and decreasing the rate of non-defective unit in the manufacturing process.

Secondly, since the rotary valve is made of plastic material, of which pressure resistant is inadequate, thus delivery of high-pressure liquid can not be performed, problems of leakage fault can easily occur.

And to increase the pressure-resistant strength of the rotary valve itself, there is the structure of the valve body made of metal material. Its advantage is great resistant to pressure, but the drawback is that the metal valve body is easy to rust, and has a heavy weight; construction is not easy, and is vulnerably impacted by environmental pH value, as a result, can be damaged by erosion.

Therefore, the inventor of the present invention with extensive experiences of product designing and manufacturing researched the structural problem of the above rotary valve, and invented the rotary valve of the present invention to solve the above problem.

SUMMARY OF THE INVENTION

The main objective of the present invention is to provide a structural innovation of the composite structure for a rotary valve with good structural strength, pressure-resistant, and enough to resist the pH of the environment to prolong usage life, moderate weight, achieve easy construction, and improve product quality.

To archive above objective, the composite structure of a rotary valve of the present invention includes a containing hole of the disc of the valve body, which includes a valve seat for matching the containing hole of the disc, and a metal valve body is formed in the valve body and covered by the valve body, wherein the metal valve body improves the explosion-proof and pressure-resistant strength and circularity of the valve body in the manufacturing process of the rotary valve, the circularity of the valve body is conducive to connect with a pipe line, thus provides benefit of controlling the rotary valve to control the liquid flowing or not.

The composite structure of a rotary valve of the present invention can be widely used in all kinds of rotary valves, such as handle/gear/electric/pneumatic/hydraulic, or chain operation, so that the disc can be opened or closed.

The metal valve body of the rotary valve of the present invention located in the valve body is designed according to the shape of the valve body.

FIGURES

Figure 3:
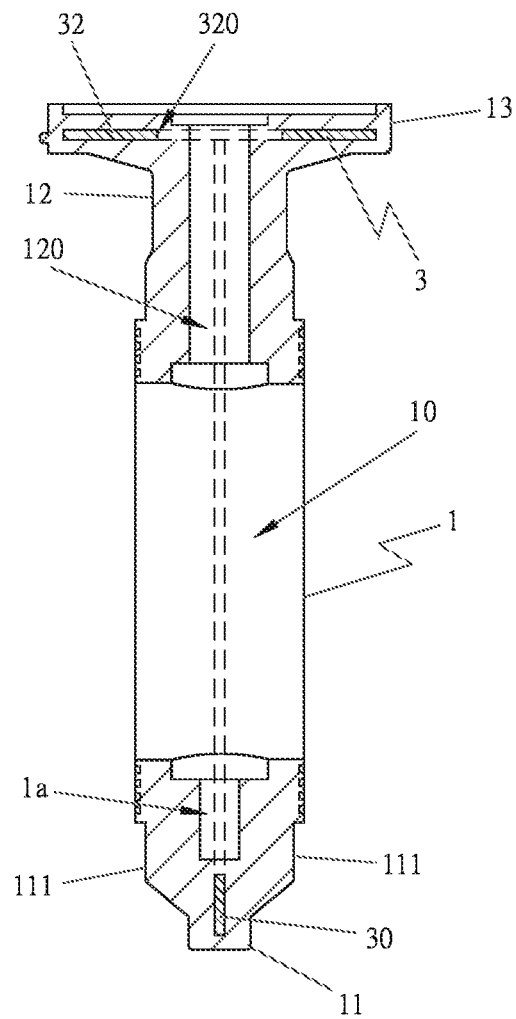
FIG. 3 is a cross sectional view of the cutting line A-A in FIG. 2.

Representative figure: FIG. 3
Symbols of representative figure:
valve body 1, valve stem groove 1a, containing hole 10, encircled body 11, ribs 111, encircled neck 12, operation component base 13, through hole 120, metal valve body 3, encircled part 30, operation component setting part 32, via hole 320

DETAILED DESCRIPTION OF THE PREFERRED EMBODIMENTS

Herein below the composite structure of the rotary valve of the present invention will be described in detail with reference to the accompanying drawings.

Figure 1:
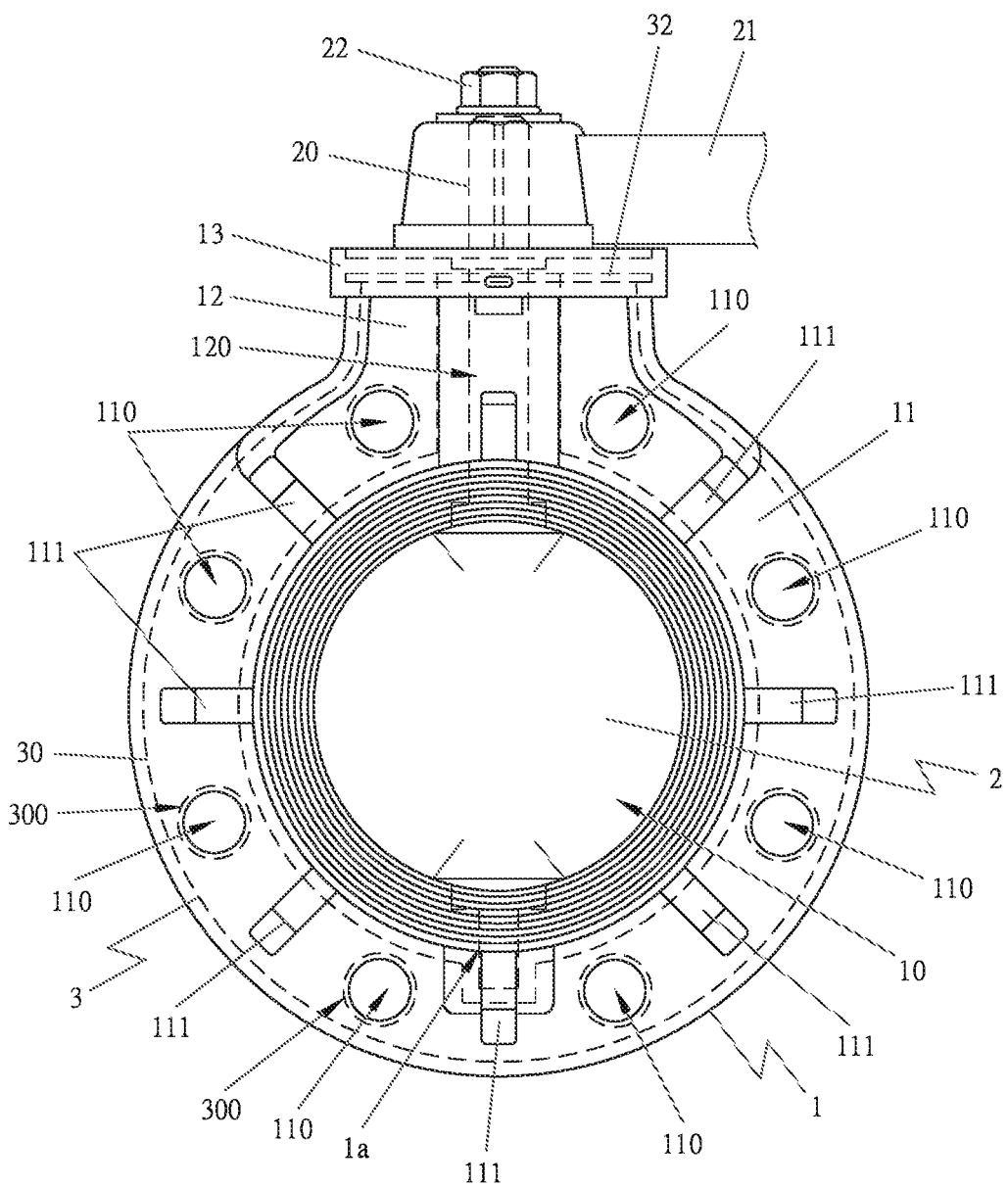
FIG. 1 is a side view of the handle-operation rotary valve of the present invention.
Figure 10:
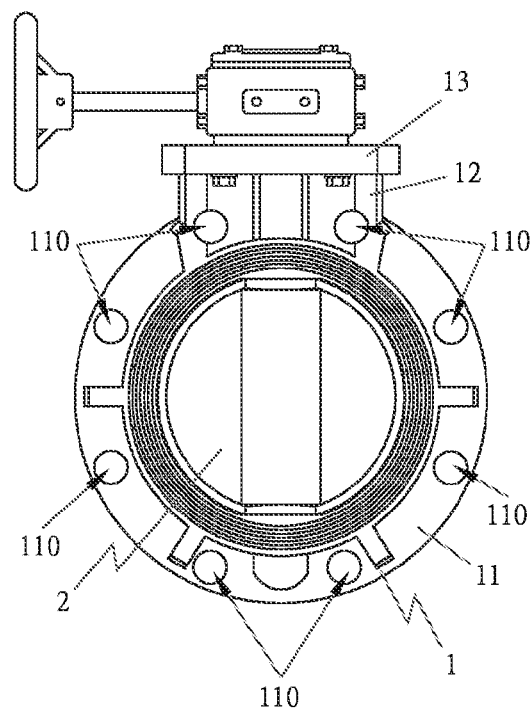
FIG. 10 shows a rotary valve body applying the present invention in gear operation.
Figures 11, 12:
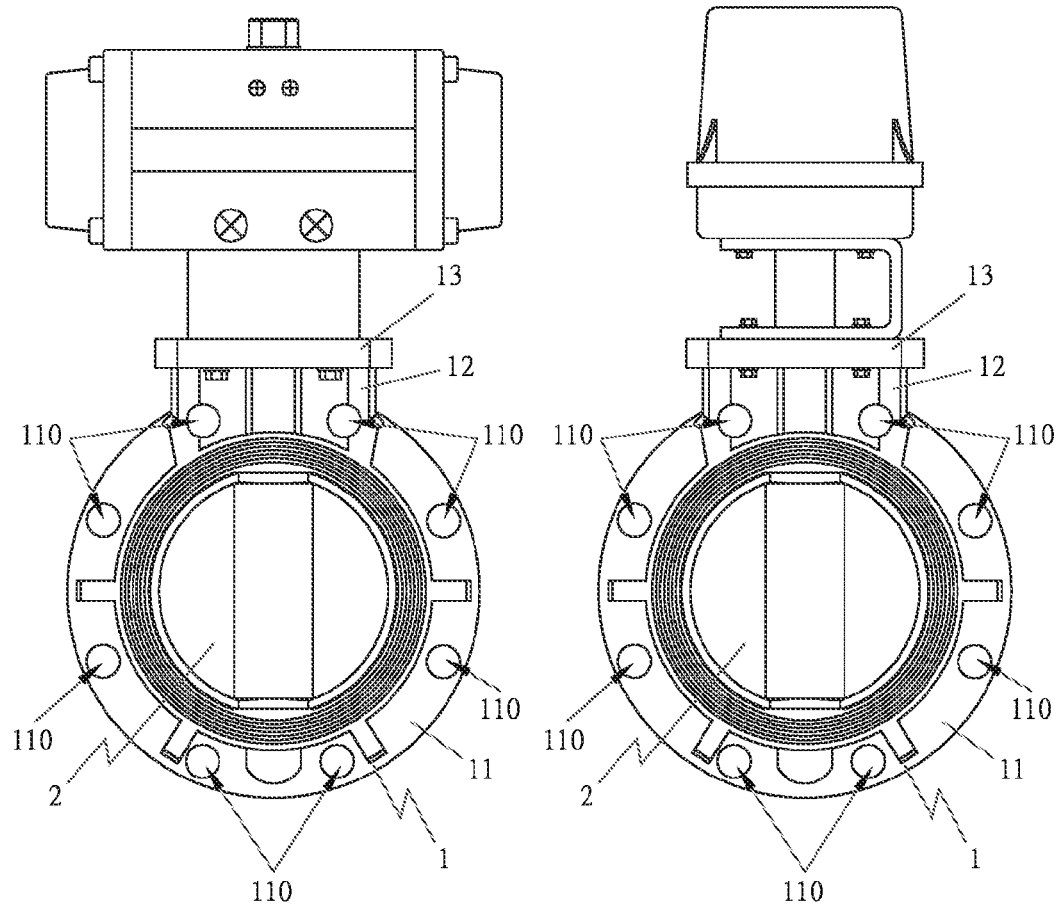
FIG. 11 shows a rotary valve body applying the present invention in pneumatic operation.
FIG. 12 shows a rotary valve body applying the present invention in electric operation.

FIG. 1 shows an embodiment of the composite structure of the handle-operation rotary valve of the present invention. The present invention not only can be used in the embodiment of the rotary valve in FIG. 1, but also can be used in other type rotary valve, such as gear operation (refer to FIG. 10), or pneumatic operation (refer to FIG. 11), or electric operation (refer to FIG. 12), or hydraulic operation or chain operation component rotary valve. The rotary valve of the present invention comprises valve body 1, and a containing hole 10 of the disc is formed for a disc 2; the disc 2 comprises a stem 20, which extends downwardly from a handle operation component 21, or gear operation (refer to FIG. 10) or pneumatic operation (refer to FIG. 11), or electric operation (refer to FIG. 12), or hydraulic operation, or chain operation component, and passes through disc 2, whereby the distal end of which is located in a stem groove 1a of the valve body 1, and fixed by a nut 22 over the handle operation component 21, such that the disc 2 can be rotated to open or close by controlling the handle operation component 21.

Figure 2:
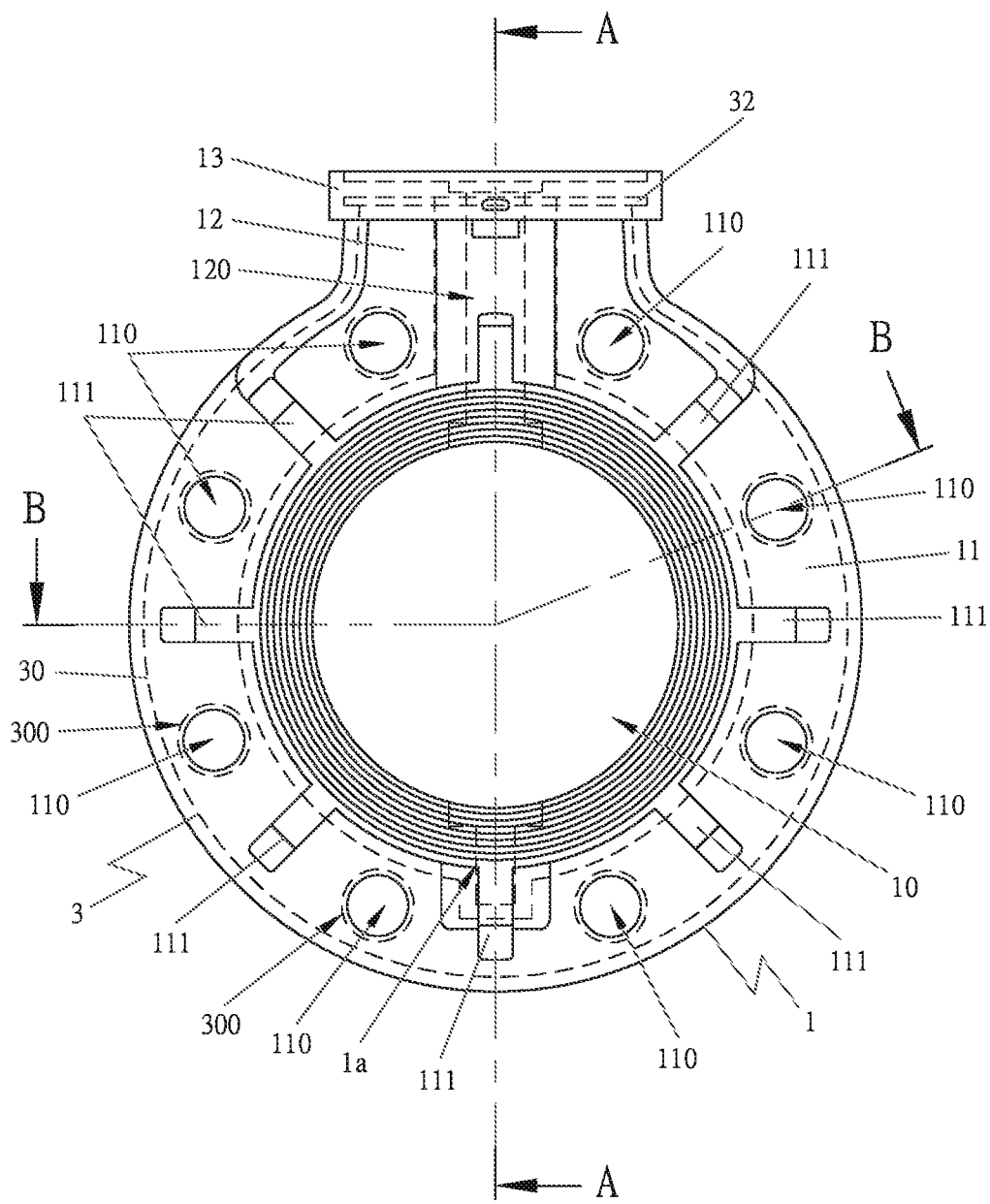
FIG. 2 is a side view of the valve body of the rotary valve of embodiment 1 of the present invention.
Figure 4:
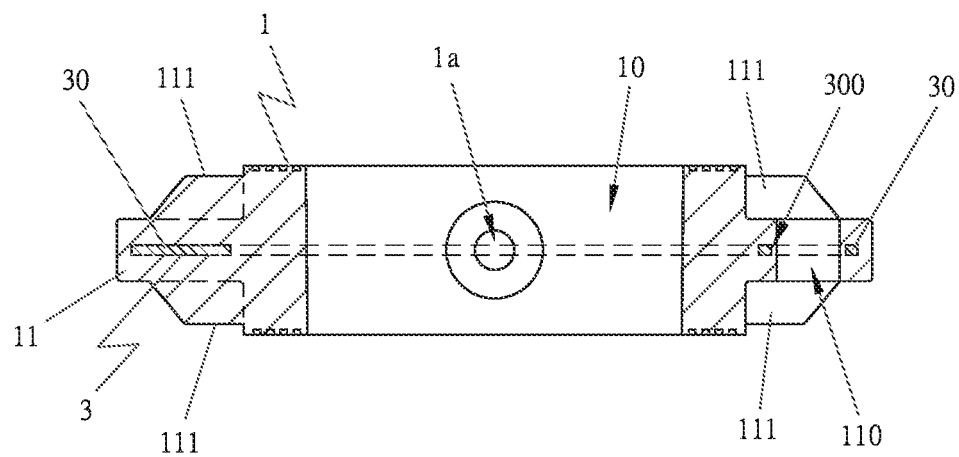
FIG. 4 is a cross sectional view of the cutting line B-B in FIG. 2.

Refer to FIG. 2-4, the valve body 1 is made of ABS plastic material, such as ACRYLONITRILE-BUTADIENE-STYRENE, propylene, butadiene and styrene copolymer, the valve body 1 also can be made of other suitable plastic materials. The valve body 1 comprises an encircled body 11 which includes multiple bolt holes 110 formed on the encircled body 11 and the valve body 1 can be fixed by bolts via the bolt holes 110 when needed according to the environment under which the rotary valve is used. Multiple ribs 111 are formed on the surfaces of both sides of the encircled body 11, which improve the impact resistance of the valve body 1; an encircled neck 12 is formed on the valve body 1 and comprises an operation component base 13 formed on the upper end of the encircled neck 12. A through hole 120 is formed between the containing hole 10 of the disc and the operation component base 13 and the stem 20 is capable to perforate through the through hole 120 easily. A metal valve body 3 is located in the valve body 1 and covered by the valve body 1.

Figure 5:
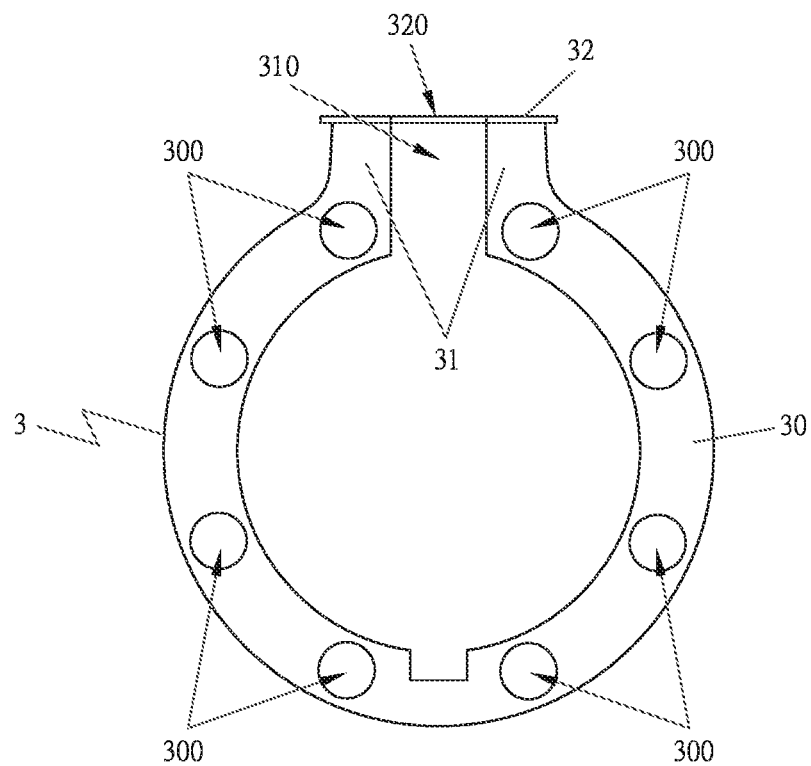
FIG. 5 is a side view of the metal valve body of embodiment 1 of the present invention.
Figure 6:
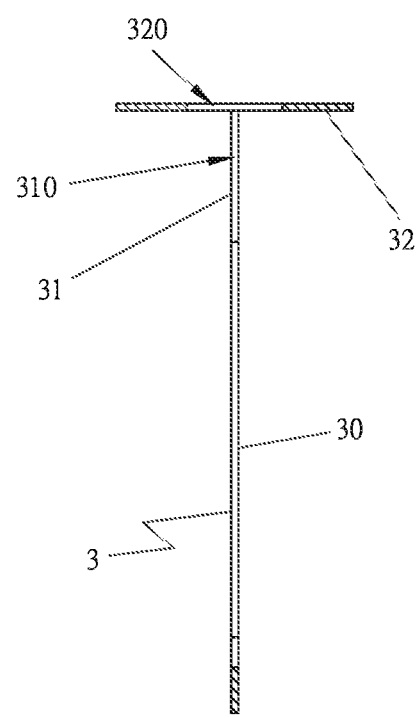
FIG. 6 is a front view of the metal valve body of embodiment 1 of the present invention.

Refer to FIGS. 4-6, showing embodiment 1 of metal valve body 3; the metal valve body 3 is an integrally molded structure. The rotary valve further comprises an encircled part 30 with multiple via holes 300 thereon, and the encircled part 30 is designed for fitting in the encircled body 11 of the valve body 1, whereby the via holes 300 of the encircled part 30 correspond to the bolt holes 110 of the encircled body 11 of the valve body 1. A neck 31 is formed on the encircled part 30 and comprises a passage 310 formed on the neck 31 for coordinating the encircled neck 12 of the valve body 1 and the through hole 120 thereof. An operation component setting part 32 is mounted on the neck 31 and comprises multiple via holes 320 for matching the operation component base 13 of the valve body 1.

Figure 7:
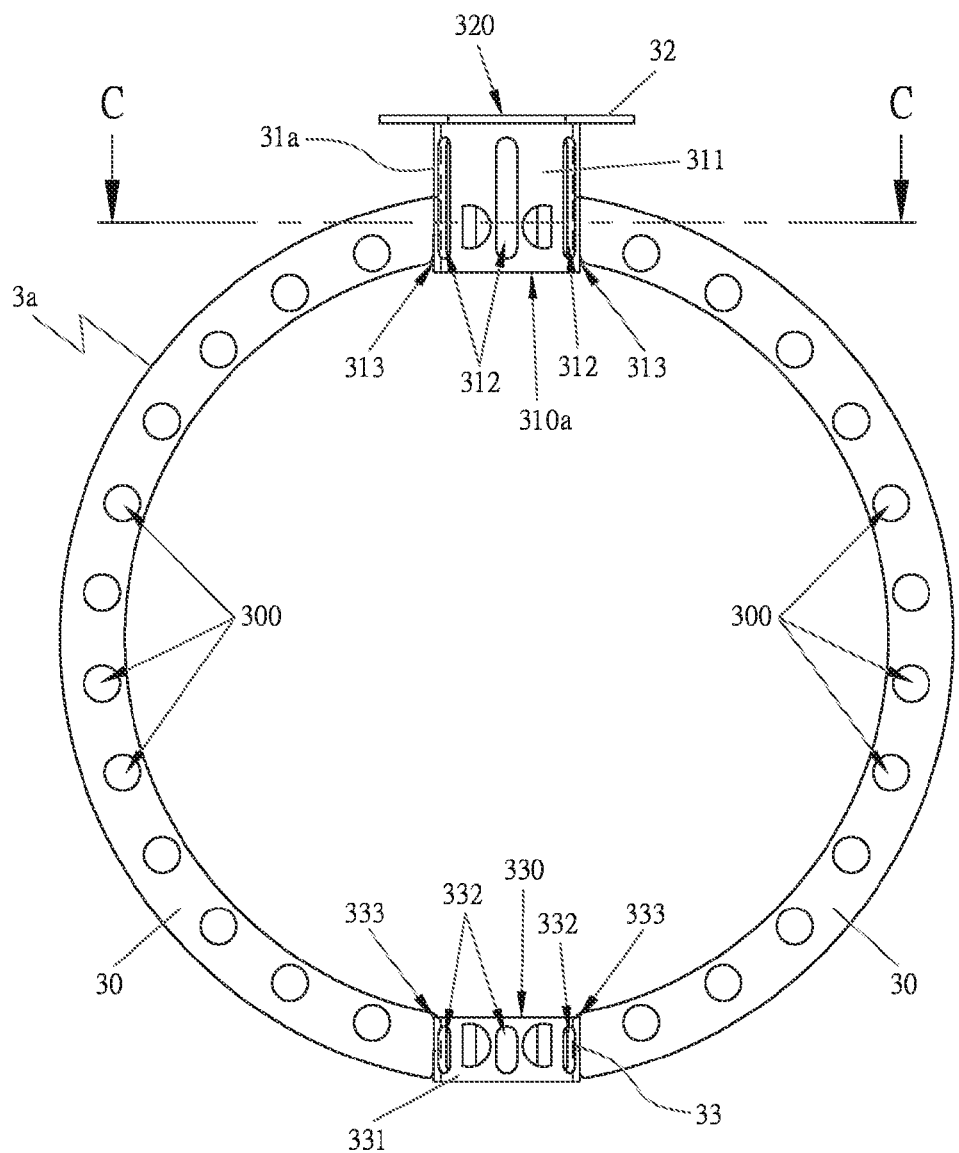
FIG. 7 is a front view of the metal valve body of embodiment 2 of the present invention.
Figure 8:
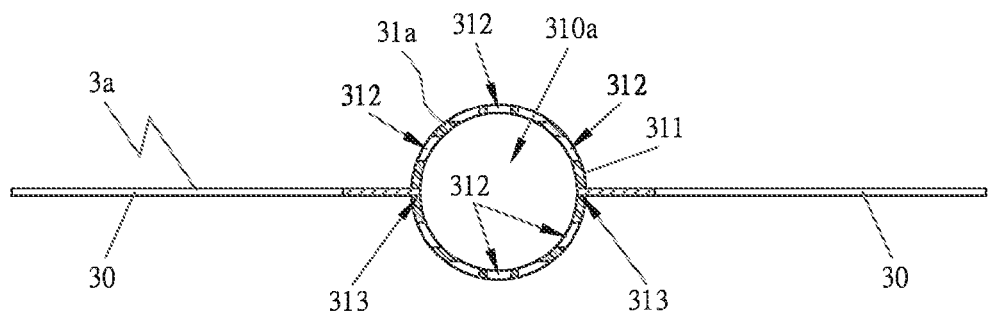
FIG. 8 is a cross sectional view of the cutting line C-C in FIG. 7.
Figure 9:
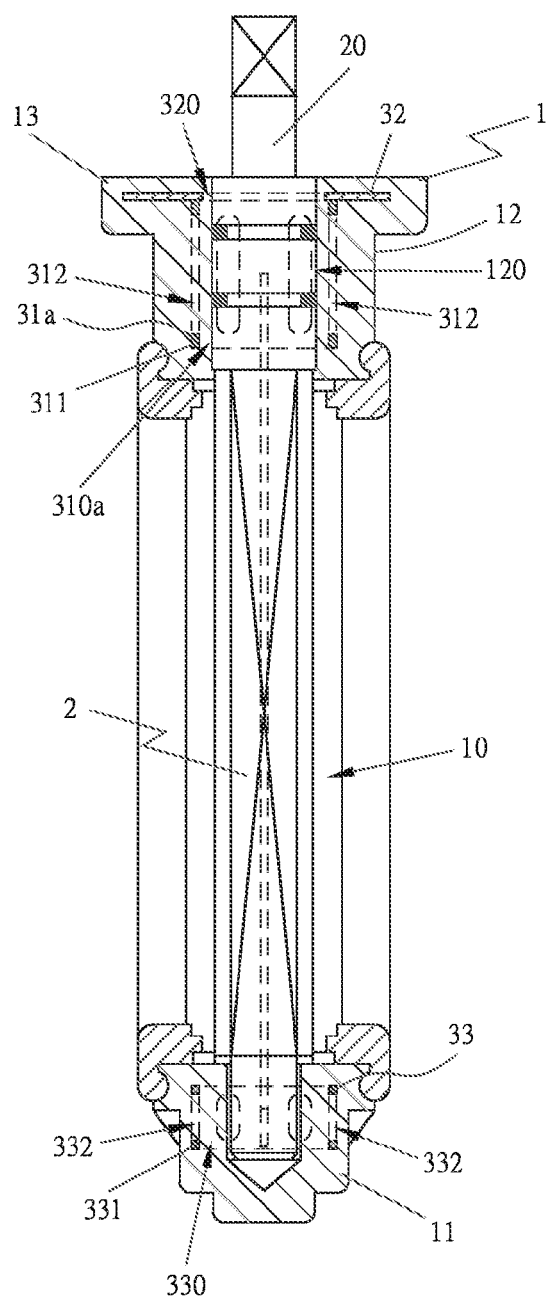
FIG. 9 is a cross sectional of embodiment 2 of the present invention combined with a valve body.

Refer to FIGS. 7-9, showing embodiment 2 of metal valve body 3, and the embodiment 2 of metal valve body 3a is more suitable for a large rotary valve; of course it could be used in a small rotary valve too. The metal valve body 3 is an integrally molded structure. The rotary valve further comprises an encircled part 30 with multiple via holes 300 thereon, and the encircled part 30 is designed for fitting in the encircled body 11 of the valve body 1, whereby the via holes 300 of the encircled part 30 correspond to the bolt holes 110 of the encircled body 11 of the valve body 1. An upper neck 31a is formed on the encircled part 30; the upper neck 31a is an encircled shape, slightly different from the neck 31 of embodiment 1, comprising a through hole 310a for matching the encircled neck 12 of the valve body 1 and the through hole 120 thereof. Refer to FIG. 9, multiple elongated holes 312 are formed on the encircled wall 311 of upper neck 31a in order to enable the valve body 1, while molding, to completely cover the upper neck 31a, and avoid the destruction of metal valve body 3a due to environmental pH value. An operation component setting part 32 is mounted on the upper neck 31a and comprises multiple via holes 320 for matching the operation component base 13 of the valve body 1. A lower neck 33 is formed on the encircled part 30; the lower neck 33 is an encircled shape corresponding to the setting location and shape of the upper neck 31a, and comprises a via hole 330 for matching downwardly formation of the stem 20 of the valve body 1. Refer to FIG. 9, multiple elongated holes 332 are formed on the encircled wall 331 of lower neck 33 in order to enable the valve body 1 to completely cover the lower neck 33, and avoid the destruction of metal valve body 3a due to environmental pH value. The combination of encircled part 30, upper neck 31a and lower neck 33 of metal valve body 3a can be either by welded or connected way. Refer to FIG. 7 and FIG. 8, to combine the encircled part 30 and the upper neck 31a, slots 313 are formed at two sides of upper neck 31a, wherein the upper end of encircled part 30 is set, and then welded or connected integrally. Refer to FIG. 7 and FIG. 8, to combine the encircled part 30 and the lower neck 33, slots 333 are formed at two sides of lower neck 33, wherein the lower end of encircled part 30 is set, and then welded or connected integrally.

In summary, the metal valve body 3 has to be put in a mold of the valve body 1 before molding the valve body 1, referring to FIG. 2 and FIG. 9. The metal valve bodies 3 and 3a are covered by the valve body 1 after the valve body is molded. Thus, the metal valve bodies 3 and 3a improve the structural strength of the valve body 1 without increasing the thickness of the valve body 1. The shape of the metal valve body 3 corresponds to the shape of the valve body, such that the valve body is capable to sustain higher liquid flow pressure of pipe and increase the explosion-proof and pressure-resistant strength thereof, with the advantages of both plastic and metal valve bodies. Without increasing the thickness of the valve body in the manufacturing process, the consumption of the plastic material can be maintained, and the valve body can be rapidly formed and molded, such that the liquid in the pipe cannot leak and can avoid environmental contamination or waste of water resources.

DESCRIPTION OF SYMBOLS valve body 1, stem slot 1a, containing hole of the disc 10, encircled body 11, bolt holes 110, ribs 111, encircled neck 12, operation component base 13, via hole 120, disc 2, stem 20, handle 21, nut 22 metal valve body 3, encircled part 30, through holes 300, neck 31, passage 310, operation component setting part 32, through holes 320, metal valve body 3a, upper neck 31a, via holes 310a, encircled wall 311, elongated hole 312, slot 313, lower neck 33, via holes 330, encircled wall 331, elongated hole 332, slot 333.

What is claimed is:

1. A composite structure of a rotary valve comprising:
a valve body including a containing hole, and a metal valve body formed in the valve body and covered by the valve body;
a disc received in the containing hole; and
a stem mounted on the disc, wherein the stem extends upwardly and is combined with an operation component, such that the disc can be opened or closed;
wherein the metal valve body comprises:
a sheet-shaped encircled part with multiple through holes;
an upper neck with encircled shape and having a passage matching a passage of an encircled neck of the valve body;
a lower neck with encircled shape, corresponding to the formation location of the stem and having a passage for matching an extension of the stem; and
an operation component setting part formed above the upper neck and having a through hole;
wherein slots are formed at two sides of the upper neck, an upper end of the sheet-shaped encircled part is inserted in the slots and then is welded or connected integrally, and a lower end of the sheet-shaped encircled part is connected to the lower neck.

2. The composite structure of rotary valve as claimed in claim 1, wherein the valve body comprises an encircled body and an operation component base;

the encircled body includes:

multiple bolt holes aligned with the multiple through holes of the sheet-shaped encircled part for fixing the rotary valve by bolts; and multiple ribs formed on the surfaces of both sides of the encircled body;

the operation component base is formed on an upper end of the encircled neck of the valve body and has a through hole aligned with the through hole of the operation component setting part; and a through hole is formed between the containing hole and the operation component base, which allows the stem to perforate through the through hole.

3. The composite structure of rotary valve as claimed in claim 1, wherein the upper neck of the metal valve body has an encircled wall and multiple elongated holes formed on the encircled wall, in order to enable the valve body while molding to completely cover the upper neck.

4. The composite structure of rotary valve as claimed in claim 1, wherein the lower neck has an encircled wall and multiple elongated holes formed on the encircled wall, in order to enable the valve body while molding to completely cover the lower neck.

5. The composite structure of rotary valve as claimed in claim 1, wherein slots are formed at two sides of the lower neck, the lower end of the sheet-shaped encircled part is inserted in the slots, and then welded or connected integrally.

* * * * *